United States Patent [19]
Becker et al.

[11] 3,956,147
[45] May 11, 1976

[54] PRODUCTION OF METAL FLUORIDES FROM FLUOSILICIC ACID

[75] Inventors: Wolf Becker, Cologne; Heinz Jonas, Opladen; Wolfgang Weiss, Cologne, all of Germany

[73] Assignee: Bayer Aktiengesellschaft, Germany

[22] Filed: Jan. 28, 1974

[21] Appl. No.: 437,133

[30] Foreign Application Priority Data
Feb. 17, 1973 Germany............................ 2307925

[52] U.S. Cl..................................... 423/19; 423/3; 423/258; 423/259; 423/341; 423/489; 423/490
[51] Int. Cl.².......................................... C01B 9/08
[58] Field of Search ........... 423/258, 259, 489, 490, 423/19, 3, 341

[56] References Cited
UNITED STATES PATENTS
3,415,039  12/1968  Rushton et al...................... 423/489
FOREIGN PATENTS OR APPLICATIONS
421,139  12/1934  United Kingdom................. 423/489
422,080  1/1935  United Kingdom................. 423/489

Primary Examiner—Benjamin R. Padgett
Assistant Examiner—Deborah L. Kyle
Attorney, Agent, or Firm—Connolly and Hutz

[57] ABSTRACT

A process which comprises reacting at a temperature above 100°C. a metal oxide, hydroxide or a mixture thereof with aqueous fluosilicic acid, said fluosilicic acid having a concentration of about 10 to 45% by weight, to form gaseous silicon tetrafluoride and the corresponding metal fluoride and recovering said metal fluoride from the reaction medium.

3 Claims, 1 Drawing Figure

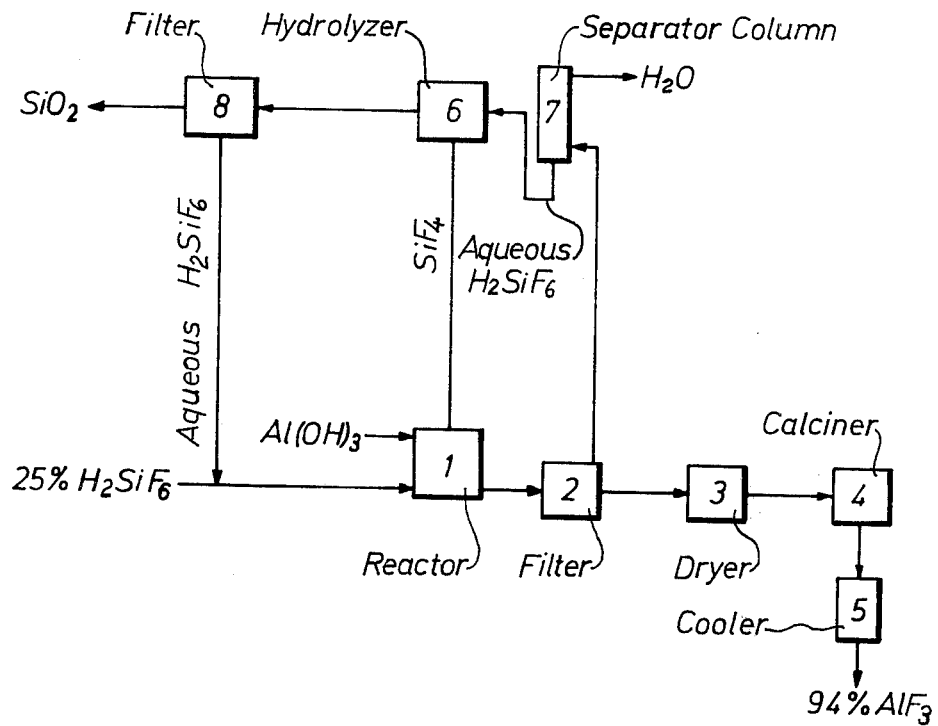

PRODUCTION OF METAL FLUORIDES FROM FLUOSILICIC ACID

This invention relates to a process for the production of fluorides, especially aluminium fluoride and calcium flouride, from fluosilicic acid of the kind obtained, for example, during the washing of waste gases in the phosphate industry or from other fluorine sources.

The increasing production of fertilisers, especially those based on phosphoric acid, and the trend to construct production plants of ever increasing capacity, have given rise to the need not only to bind the fluorine liberated during the phosphate disintegration process, but also to find an economic use for the fluosilicic acid formed during this process. In view of developments in this direction fluosilicic acid is now available as a starting material for the production of fluorides for which other starting materials have hitherto been used.

Several processes have already been proposed for converting fluosilicic acid into aluminium fluoride. Proposals which have attracted commercial interest can be divided into the so-called acid processes, for example according to DAS 1,107,650, British Patent No. 1,074,665, U.S. Pat. No. 3,175,882 and DAS 1,062,681 and into the alkaline processes, for example according to DOS 1,925,352 DOS 1,592,195, DOS 2,023,306 and others. In addition to the problem of serious corrosion, the acid processes are also attended by the disadvantage that the reaction of fluosilicic acid with aluminium hydroxide initially results in the formation of a metastable system from which the precipitated silicon dioxide has to be quickly removed before precipitation of the aluminium fluoride hydrate which, initially, is still present in solution. In addition, voluminous apparatus are required because periods of several hours are required to obtain as quantitative a precipitation of the aluminium fluoride as possible. The mother liquor contains not insignificant quantities of fluorine and sizeable quantities of aluminium. The socalled alkaline processes, in which ammonium fluoride is used as intermediate compound, necessitate several processing stages with a corresponding number of circuits. Furthermore, the energy input is considerable.

The present invention relates to a process for directly reacting an aqueous fluosilicic acid with a metal oxide compound to form the corresponding metal fluorides, which is free or substantially free from the disadvantages referred to above. The process according to the invention is characterised by the fact that the aqueous fluosilicic acid and the metal oxide compound are reacted at an elevated temperature such as at least 60°C and corresponding pressure to form the corresponding metal fluorides, the reaction being accompanied by the liberation of gaseous silicon tetrafluoride. Following conversion into fluosilicic acid, the silicon tetrafluoride may optionally be reused as starting material.

In addition, the silicon tetrafluoride separated off in gaseous form can be reacted in conventional manner to form salts, especially the alkali salts of fluosilicic acid. However, the silicon tetrafluoride is preferably recycled in the form of fluosilicic acid.

Broadly speaking, the new process can be characterised by the following equation:

$$MeO + H_2SiF_6 \rightarrow MeF_2 + SiF_4 + H_2O \qquad 1$$

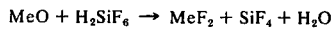

although this does not take into account that, in general, the composition of the fluosilicic acid in the gaseous fluosilicic acid solutions does not correspond to the above formula, instead a fluctuating deficit of fluorine is generally present.

Accordingly, the composition of the fluosilicic acid is better represented by the formula $H_xSiF_{(4+x)}$ in which $x$ is an integer or a fraction which is less than 2.

The fluosilicic acids are used in any concentration, preferably being used with a concentration of about 10 to 45% by weight. Metal oxide compounds which give metal fluorides, metal oxyfluorides or metal hydroxyfluorides or mixtures thereof, can be used as the metal oxide compounds. In accordance with the invention, these compounds are referred to hereinafter as metal fluorides. The metal oxide compounds can be used in the form of their hydroxides, oxides, carbonates or mixtures thereof. In accordance with the invention, they are referred to as metal oxide compound. The oxidic compounds of aluminium and, optionally, of calcium as well are preferably reacted by the process according to the invention to form the corresponding fluorides because, under the reaction conditions, these compounds form substantially insoluble fluorides which can readily be separated off from the liquid reaction medium. However, it is also possible to use other metal oxide compounds which initially form soluble fluorides. To separate these fluorides, the reaction medium initially has to be concentrated by evaporation. In general, it is possible in this way to obtain the fluorides of the elements Li, Mg, Ca, Sr, Ba, Ra, Al, V, Mn, Cr, Fe, Co, Ni, the rare earths and actinides (especially $UF_4$). Especially preferred metals include Al, Ca, Cr and U.

If these fluorine compounds are intended to be as free from silica as possible, it is necessary to use an excess of fluosilicic acid beyond the stoichiometry indicated in equation (1). 1 to 20% stoichiometric excess, based on said metal oxide, is preferred.

In general, the silicon tetrafluoride can be liberated at temperatures above 60°C, especially above 100°C under corresponding pressures of more than 1 atmosphere, although it is preferably liberated at temperatures of from 140° to 240°C under corresponding pressures of from about 5 to 30 atmospheres gauge in a closed pressure resistant reaction zone.

As already mentioned, the gaseous silicon tetrafluoride liberated during the reaction is preferably recycled. For this purpose, the silicon tetrafluoride can be hydrolyzed in aqueous medium to form fluosilicic acid and solid silicon dioxide, and the fluosilicic acid formed is returned to the process following separation of the silicon dioxide by filtration or decantation. In a particularly preferred embodiment, the silicon tetrafluoride formed is hydrolysed with most of the filtrate obtained during separation of the metal fluoride to form fluosilicic acid and solid silicon dioxide and the fluosilicic acid can then be reused as starting material following separation of the $SiO_2$.

In cases where the fluosilicic acid is worked up during the phosphate disintegration process, the filtrate obtained during separation of the metal fluoride can advantageously be used as washing solution for the fluorine-containing spent gases and, in this way, can be re-enriched with fluosilicic acid and hydrofluoric acid. In this embodiment, it is also possible to channel the silicon tetrafluoride blown off from the pressure reaction into the spent-gas wash and to react it there to form fluosilicic acid. Apart from the metal fluoride, no waste products are formed in this process because all the secondary products are recycled.

The actual reaction can be carried out both continuously and in batches in a closed pressure resistant reaction zone (autoclave). In one particular embodiment of the process, the pressure reaction can be carried out in two or even more stages, optionally even under different pressures, in the form of a cascade.

The process according to the invention is described in more detail in the following with reference to the production of aluminium fluoride. The following description applies similarly to the production of the other metal fluorides.

One special embodiment of the process for producing aluminium fluoride is diagrammatically illustrated in the Figure in which the reference numerals used have the following meaning:

1. a single-stage or multi-stage autoclave for the pressure reaction;
2. a filter unit, for example a rotary filter or a decanter and continuous bulk centrifuge;
3. a drying unit, for example a disc dryer;
4. a calcination unit, for example a fluidised bed or rotary kiln;
5. a cooler, for example fluidised bed or cooling drum;
6. a hydrolyzer, for example multi-stage rotary washer or disc washer.
7. separation column; and
8. filter unit, for example a rotary filter or a decanter.

In the embodiment illustrated in the FIGURE, the aqueous $H_2SiF_6$-containing solution is initially combined with the fluosilicic-acid-containing solution coming from the filter 8 and fed with aluminium hydroxide into the autoclave where the following reaction takes place:

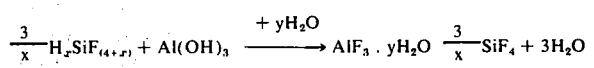

In a batch test, a quantity of silicon tetrafluoride corresponding to the above equation was liberated at elevated pressure, preferably at a pressure in the range of from 3 to 30 atmospheres gauge, and blown off together with steam whilst the aluminium fluoride accumulated in solid form in the sump of the autoclave. After the silicon tetrafluoride had been run off in vapour form, the resulting $AlF_3 \cdot yH_2O$ ($y = 0.15$ to $1$) was run off in the form of an aqueous suspension. The aqueous suspension contained excess fluosilicic acid in soluble form. The solid was separated off from the aqueous solution on the filter 2, dried in the dryer 3 and calcined in the calcination unit 4.

The filtrate from filter 2 was concentrated in column 7 and reacted in the hydrolyzer with the silicon tetrafluoride run off from autoclave 1. The silicic acid formed was separated off on the filter 8 and the filtrate obtained was combined with the fresh fluosilicic acid and introduced into the autoclave 1. As already mentioned, the units 6, 7 and 8 can be omitted in cases where the installation for producing aluminium fluoride is combined with a phosphate disintegration plant. In cases such as these, the filtrate from filter 2 can be introduced as absorption solution into the spent-gas washer of the phosphate disintegration plant and, in addition, the silicon tetrafluoride from autoclave 1 can be added to the spent gas from the phosphate disintegration process and reacted in the spent gas washer to form fluosilicic acid.

The aluminium fluoride accumulating is surprisingly low in silicon dioxide so that it is suitable for use as a melt flux in the aluminium industry without any need for additional treatment. Depending upon the pressure and temperature at which it was produced, it only contains from 1 to 0.15 mole of water of crystallisation per mol of $AlF_3$ and shows limited solubility so that the aluminium component is reacted in extremely high yields (90 to 99%). In addition, the aluminium fluoride accumulating in the low-water form can be readily calcined into anhydrous $AlF_3$ because hardly any hydrolysis takes place by virtue of the small quantity of water to be removed. In general, an aluminium fluoride is obtained which, after calcination, contains at least 90% by weight of $AlF_3$, preferably 95% by weight of $AlF_3$, and only 0.05 to 0.3% by weight of $SiO_2$, the balance being $Al_2O_3$.

The process according to the invention is illustrated by the following Examples:

Example 1

In a batch test, approximately 6.4 kg of $SiF_4$ and steam were blown off in about 30 minutes from a mixture of 49.6 kg of a 20% fluosilicic acid solution and 3.26kg of aluminium hydroxide under a constant pressure of 10atms gauge, the temperature of the autoclave sump rising from 177°C to 184°C.

The solid was filtered off from the sump, washed with water and dried; it weighed 3.5 kg. 3.07 kg of a solid containing 92% by weight of $AlF_3$, 0.15% by weight of $SiO_2$, and $Al_2O_3$ as the balance was obtained after calcination at 550°C.

Example 2

In a batch test, 5.3 kg of a 97.2% fluospar containing 0.5% of $SiO_2$ were obtained from a mixture of 49.6 kg of a 20% fluosilicic acid solution and 3.94 kg of calcium oxide after the $SiF_4$ had been blown off under a pressure of 20 atms. gauge and at a temperature of approximately 217°C.

Example 3

125 g of a chromium oxide hydrate with 28% of $Cr_2O_3$ were heated with 550 g of a 20% fluosilicic acid in an autoclave until a pressure was reached of 20 atms. gauge. 300 g of water + $SiF_4$ were blown off through a capillary tube whilst keeping the pressure constant, the autoclave then cooled down and the sump removed. From this a solid was obtained by evaporation which contained 45 g of $CrF_3$ with 0.2 g of $SiO_2$.

What is claimed is:

1. A process which comprises heating a metal oxide, hydroxide or mixture thereof wherein the metal is selected from the group consisting of aluminum, calcium, chromium and uranium in aqueous fluosilicic acid, to about 140° to 240°C at a pressure of from 5 to 30 atmospheres gauge, said fluosilicic acid having a concentration of about 10 to 45% by weight and being present in a 1 to 20% stoichiometric excess, based on the metal oxide, hydroxide or mixture thereof, whereby silicon tetrafluoride is removed from said fluosilicic acid in gaseous form and the remaining hydrogen fluoride in said aqueous solution forms the corresponding metal fluoride and recovering said metal fluoride from the reaction mixture.

2. The process of claim 1 wherein the gaseous silicon tetrafluoride is hydrolyzed in an aqueous medium to silicon dioxide and aqueous fluosilicic acid and the latter is utilized as aqueous fluosilicic acid reactant to produce said corresponding metal fluoride.

3. The process of claim 1 wherein said reaction mixture contains suspended metal fluoride and aqueous fluosilicic acid and said aqueous fluosilicic in said reaction mixture is utilized as aqueous fluosilicic acid reactant to produce said corresponding metal fluoride.

* * * * *